United States Patent
Yoshida et al.

(10) Patent No.: US 9,437,888 B2
(45) Date of Patent: Sep. 6, 2016

(54) FUEL CELL SYSTEM AND CONTROL METHOD THEREFOR

(75) Inventors: Michio Yoshida, Mioshi (JP); Yuji Kakeno, Nisshin (JP); Tomoya Ogawa, Toyota (JP); Hiromitsu Kawamori, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1085 days.

(21) Appl. No.: 13/520,044

(22) PCT Filed: Dec. 13, 2010

(86) PCT No.: PCT/IB2010/003210
§ 371 (c)(1),
(2), (4) Date: Jun. 29, 2012

(87) PCT Pub. No.: WO2011/086411
PCT Pub. Date: Jul. 21, 2011

(65) Prior Publication Data
US 2012/0274137 A1 Nov. 1, 2012

(30) Foreign Application Priority Data
Jan. 18, 2010 (JP) .................. 2010-007906

(51) Int. Cl.
*H02J 1/00* (2006.01)
*H01M 8/04* (2016.01)
(Continued)

(52) U.S. Cl.
CPC ...... *H01M 8/04544* (2013.01); *B60L 11/1881* (2013.01); *H01M 8/04574* (2013.01);
(Continued)

(58) Field of Classification Search
CPC .................. H01M 8/04544; H01M 8/04574; H01M 8/04865; H01M 8/04604; H01M 8/04925; H01M 10/44; H01M 10/46; H01M 16/006; H01M 8/04895; H01M 2250/20; B60L 11/1881; Y10T 307/50; Y02T 90/34; Y02T 90/32; Y02E 60/50
USPC ........................................................... 307/72
See application file for complete search history.

(56) References Cited

U.S. PATENT DOCUMENTS 7,785,745 B2 * 8/2010 Oto .................. H01M 8/04559
429/413
2003/0194586 A1 10/2003 Sugiura et al.
(Continued)

FOREIGN PATENT DOCUMENTS

CN      101512883 A     8/2009
EP        1 091 437 A1    4/2001
(Continued)

OTHER PUBLICATIONS

International Search Report and Written Opinion of PCT/IB2010/003210 mailed May 16, 2011.
(Continued)

*Primary Examiner* — Jared Fureman
*Assistant Examiner* — Emmanuel R Dominique
(74) *Attorney, Agent, or Firm* — Kenyon & Kenyon LLP (57) ABSTRACT

During an intermittent operation of the fuel cell, a demanded FC voltage calculation portion calculates a predetermined voltage that is below a heightened potential avoidance threshold voltage as a demanded FC voltage, and outputs the voltage to a converter. When during the intermittent operation of the fuel cell, a deviation obtained by subtracting a generated power of the fuel cell from a system's allowable power that is allowable in the fuel cell system becomes less than or equal to a value 0, the demanded FC voltage correction portion corrects a command value provided for the converter so that the deviation becomes equal to the value 0.

7 Claims, 8 Drawing Sheets

(51) Int. Cl.
  *B60L 11/18* (2006.01)
  *H01M 10/44* (2006.01)
  *H01M 10/46* (2006.01)
  *H01M 16/00* (2006.01)

(52) U.S. Cl.
  CPC ..... *H01M8/04604* (2013.01); *H01M 8/04865* (2013.01); *H01M 8/04895* (2013.01); *H01M 8/04925* (2013.01); *H01M 10/44* (2013.01); *H01M 10/46* (2013.01); *H01M 16/006* (2013.01); *H01M 2250/20* (2013.01); *Y02E 60/50* (2013.01); *Y02T 90/32* (2013.01); *Y02T 90/34* (2013.01); *Y10T 307/50* (2015.04)

(56) References Cited

U.S. PATENT DOCUMENTS

| | | | |
|---|---|---|---|
| 2004/0018399 A1* | 1/2004 | Jung | B60L 11/1881 429/9 |
| 2009/0190375 A1 | 7/2009 | Manabe et al. | |
| 2009/0230917 A1* | 9/2009 | Kojima | B60L 11/1851 320/101 |
| 2009/0284080 A1* | 11/2009 | Kojima | B60L 11/1881 307/85 |
| 2009/0289497 A1 | 11/2009 | Ichikawa et al. | |
| 2010/0055521 A1* | 3/2010 | Umayahara et al. | 429/23 |
| 2010/0173212 A1* | 7/2010 | Senoue | H01M 8/04186 429/432 |
| 2010/0248054 A1 | 9/2010 | Umayahara et al. | |
| 2011/0086286 A1* | 4/2011 | Ganapathy | H01M 8/04067 429/432 |

FOREIGN PATENT DOCUMENTS

| | | | |
|---|---|---|---|
| JP | 2008-029050 A | | 2/2008 |
| JP | 2009-117070 A | | 5/2009 |
| JP | 2009-129647 A | | 6/2009 |
| JP | 2009129639 A | | 6/2009 |
| WO | WO2008099743 | * | 8/2008 |
| WO | 2010/112995 A1 | | 10/2010 |
| WO | 2010/112998 A1 | | 10/2010 |

OTHER PUBLICATIONS

Japanese Office Action of JP 2010-007906 drafted Jan. 25, 2012 and Partial Translation thereof.

* cited by examiner

```
                    12 CONVERTER
                    COMMAND VOLTAGE
                    OUTPUT PORTION
                    201
    ┌─────────────────────────────────────┐
    │                                     │
    │         240                         │
    │    ┌──────────────┐                 │
    │    │  DRIVING     │  S     250      │
    │    │  CONDITION   ├──→ ┌─────────┐  │
    │    │  DETERMINATION│    │  PID    │ MV
    │    │  PORTION     │    │ CONTROL ├──┼──→(+)── CONVERTER
    │    │ ·ON WHEN D≤0 │    │ PORTION │  │   (+)   COMMAND
    │    │ ·OFF WHEN D>0│    └────▲────┘  │   115   VOLTAGE
    │    └──────▲───────┘         │       │
    │           │ D               │       │
    │          (+)  230           │       │
    │       Psy │ ─               │       │
    │     ┌─────┤                 │       │
    │     │   Pfc                 │       │
    │  ┌──┴───┐ ┌──────┐          │       │
    │  │SYSTEM│ │  FC  │          │       │
    │  │  'S  │ │GENER-│          │       │
    │  │ALLOW-│ │ ATED │          │       │
    │  │ABLE  │ │POWER │          │       │
    │  │POWER │ │CALC. │          │       │
    │  │CALC. │ │PORT. │          │       │
    │  │PORT. │ │      │          │       │
    │  └──┬───┘ └──┬───┘          │       │
    │     220     210             │       │
    └─────────────────────────────┼───────┘
                                  │
                         ┌────────┴──────┐
                         │   DEMANDED    │ Vrf
                         │  FC VOLTAGE   ├──→
                         │  CALCULATION  │
                         │   PORTION     │
                         └───────┬───────┘
                                110
         FC VOLTAGE ──→
         FC CURRENT ──→
```

FUEL CELL SYSTEM AND CONTROL METHOD THEREFOR

This is a 371 national phase application of PCT/IB2010/003210 filed 13 Dec. 2010, claiming priority to Japanese Patent Application No. 2010-007906 filed 18 Jan. 2010, the contents of which are incorporated herein by reference.

BACKGROUND OF THE INVENTION

1. Field of the Invention

The invention relates to a fuel cell system that includes a fuel cell and a secondary cell, and to a control method for the fuel cell system.

2. Description of the Related Art

In recent years, hybrid systems that have a secondary electric cell separately from a main energy source are drawing attention. In conjunction with such a hybrid system, there is known a construction that performs a voltage feedback control that uses a deviation between a detected voltage and a target voltage along an electric power line (see, e.g., Japanese Patent Application Publication No. 2008-29050 (JP-A-2008-29050)).

The foregoing hybrid systems include a fuel cell system that uses a fuel cell. The fuel cell system performs an intermittent operation in which the electricity generation of the fuel cell is temporarily stopped during low-load operations, such as during an idling operation, during a low-speed travel, during regenerative braking, etc., and the secondary cell is caused to supply electric power to a load (a vehicle electric motor, or the like), in order to improve fuel economy. Incidentally, during the intermittent operation, forced electricity generation is sometimes performed in order to increase the endurance of the fuel cell.

However, in the case where a related-art technology of performing the voltage feedback control is adopted in the fuel cell system, there is possibility of failing to perform a proper electric power control and therefore causing overcharge of the secondary cell during an intermittent operation of the fuel cell.

SUMMARY OF THE INVENTION

The invention provides a fuel cell system that prevents overcharge of a secondary cell during an intermittent operation of the fuel cell, and also provides a control method for the fuel cell system.

A first aspect of the invention is a fuel cell system that includes a fuel cell and a secondary cell, and that supplies electric power to a load, and that further includes: a converter that controls output voltage of the fuel cell; and a high-potential avoidance control portion that restrains the output voltage of the fuel cell from becoming greater than or equal to a predetermined heightened potential avoidance threshold voltage that is lower than an open-circuit voltage of the fuel cell by controlling a command value provided for the converter during an intermittent operation of the fuel cell, wherein the high-potential avoidance control portion includes a converter command value correction portion that corrects the command value for the converter so that a deviation obtained by subtracting a generated power of the fuel cell from a system's allowable power that is allowable in the fuel cell system becomes equal to a value 0 when the deviation is below the value 0.

According to the fuel cell system in accordance with the first aspect of the invention, during the intermittent operation of the fuel cell, the output voltage of the fuel cell is restrained from becoming greater than or equal to the heightened potential avoidance threshold voltage, and when during this control the deviation obtained by subtracting the generated power of the fuel cell from the system's allowable power becomes lower than the value 0, the electric power control is performed so that the deviation becomes equal to the value 0. Therefore, this system is able to prevent an event in which when the electricity generation is performed so as to avoid heightened potential during the intermittent operation of the fuel cell, the charging of the secondary cell continues and the secondary cell becomes overcharged.

In the fuel cell system in accordance with the first aspect of the invention, the converter command value correction portion may obtain the system's allowable power by summing a demanded power of the fuel cell system and a charging power restriction value regarding the secondary cell.

This construction makes it possible to measure the system's allowable power with high accuracy.

Besides, the fuel cell system may further include an output detection portion that detects output current of the fuel cell or the output voltage of the fuel cell, and the converter command value correction portion may include: a feedback control portion that performs a feedback control based on the deviation; a determination portion that determines which one of two sections of a current-voltage curve of the fuel cell divided by a bend point at which the curvature reaches a maximum value contains a point of the output current or the output voltage detected by the output detection portion; and a gain switching portion that switches gain of the feedback control based on a result of determination of the determination portion.

Due to this construction, the gain in the feedback control can be switched at the bend point on the current-voltage curve (i.e., different gains are set for two sections of the current-voltage curve divided by the bend point), so that the controllability of the feedback control can be heightened.

A second aspect of the invention is a fuel cell system that includes a fuel cell and a secondary cell, and that supplies electric power to a load, and that further includes: a converter that controls output voltage of the fuel cell; and a high-potential avoidance control portion that, during an intermittent operation of the fuel cell, restrains output voltage of the fuel cell from becoming greater than or equal to a predetermined heightened potential avoidance threshold voltage that is lower than an open-circuit voltage of the fuel cell, by controlling a command value provided for the converter, wherein the high-potential avoidance control portion includes a converter command value correction portion that corrects the command value for the converter so that a deviation obtained by subtracting an output voltage of the secondary cell from an upper-limit voltage of the secondary cell becomes equal to a value 0 when the deviation is lower than the value 0.

According to the fuel cell system in accordance with the second aspect of the invention, during the intermittent operation of the fuel cell, the output voltage of the fuel cell is restrained from becoming greater than or equal to the heightened potential avoidance threshold voltage, and when during this control the deviation obtained by subtracting the output voltage of the secondary cell from the upper-limit voltage of the secondary cell becomes lower than the value 0, the electric power control is performed so that the deviation becomes equal to the value 0. Therefore, this system is able to prevent an event in which when the electricity generation is performed so as to avoid heightened potential during the intermittent operation of the fuel cell, the charging of the secondary cell continues and the secondary cell becomes overcharged.

A third aspect of the invention is a fuel cell system that includes a fuel cell and a secondary cell, and that supplies electric power to a load, and that further includes: a converter that controls output voltage of the fuel cell; and a high-potential avoidance control portion that restrains the output voltage of the fuel cell from becoming greater than or equal to a predetermined heightened potential avoidance threshold voltage that is lower than an open-circuit voltage of the fuel cell by controlling a command value provided for the converter during an intermittent operation of the fuel cell, wherein the high-potential avoidance control portion includes a converter command value correction portion that corrects the command value for the converter so that a deviation obtained by subtracting an output current of the secondary cell from a lower-limit current of the secondary cell becomes equal to a value 0 when the deviation is greater than the value 0.

According to the fuel cell system in accordance with the third aspect of the invention, during the intermittent operation of the fuel cell, the output voltage of the fuel cell is restrained from becoming greater than or equal to the heightened potential avoidance threshold voltage, and when during this control the deviation obtained by subtracting the output current of the secondary cell from the lower-limit current of the secondary cell becomes greater than the value 0, the electric power control is controlled so that the deviation becomes equal to the value 0. Therefore, this system is able to prevent an event in which when the electricity generation is performed so as to avoid heightened potential during the intermittent operation of the fuel cell, the charging of the secondary cell continues and the secondary cell becomes overcharged.

A fourth aspect of the invention is a fuel cell system that includes a fuel cell and a secondary battery, and that supplies electric power to a load, and that further includes: a converter that controls output voltage of the fuel cell; a converter command value correction portion that performs a feedback control of a correction value for a command value provided for the converter based on a deviation obtained by subtracting a generated electric power of the fuel cell from a demanded output electric power of the fuel cell, and that adds the correction value to the command value provided for the converter; and an output detection portion that detects output current of the fuel cell or the output voltage of the fuel cell, wherein the converter command value correction portion includes: a determination portion that determines which one of two sections of a current-voltage curve of the fuel cell divided by a bend point contains a point of an output current or an output voltage of the fuel cell detected by the output detection portion; and a gain switching portion that switches gain of the feedback control based on a result of determination of the determination portion.

According to the fuel cell system in accordance with the fourth aspect of the invention, the generated electric power of the fuel cell can be made equal to the demanded output electric power, and the gain in the feedback control can be switched at the bend point on the current-voltage curve (i.e., different gains are set for two sections of the current-voltage curve divided by the bend point), so that the controllability in the feedback control can be heightened.

Furthermore, the invention can also be realized in various forms other the first to fourth aspects. For example, the invention can also be realized by a control method that includes the steps of performing the foregoing actions of various portions provided in the fuel cell system of the invention.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the invention will be described hereinafter with reference to the drawings.

Figure 1:
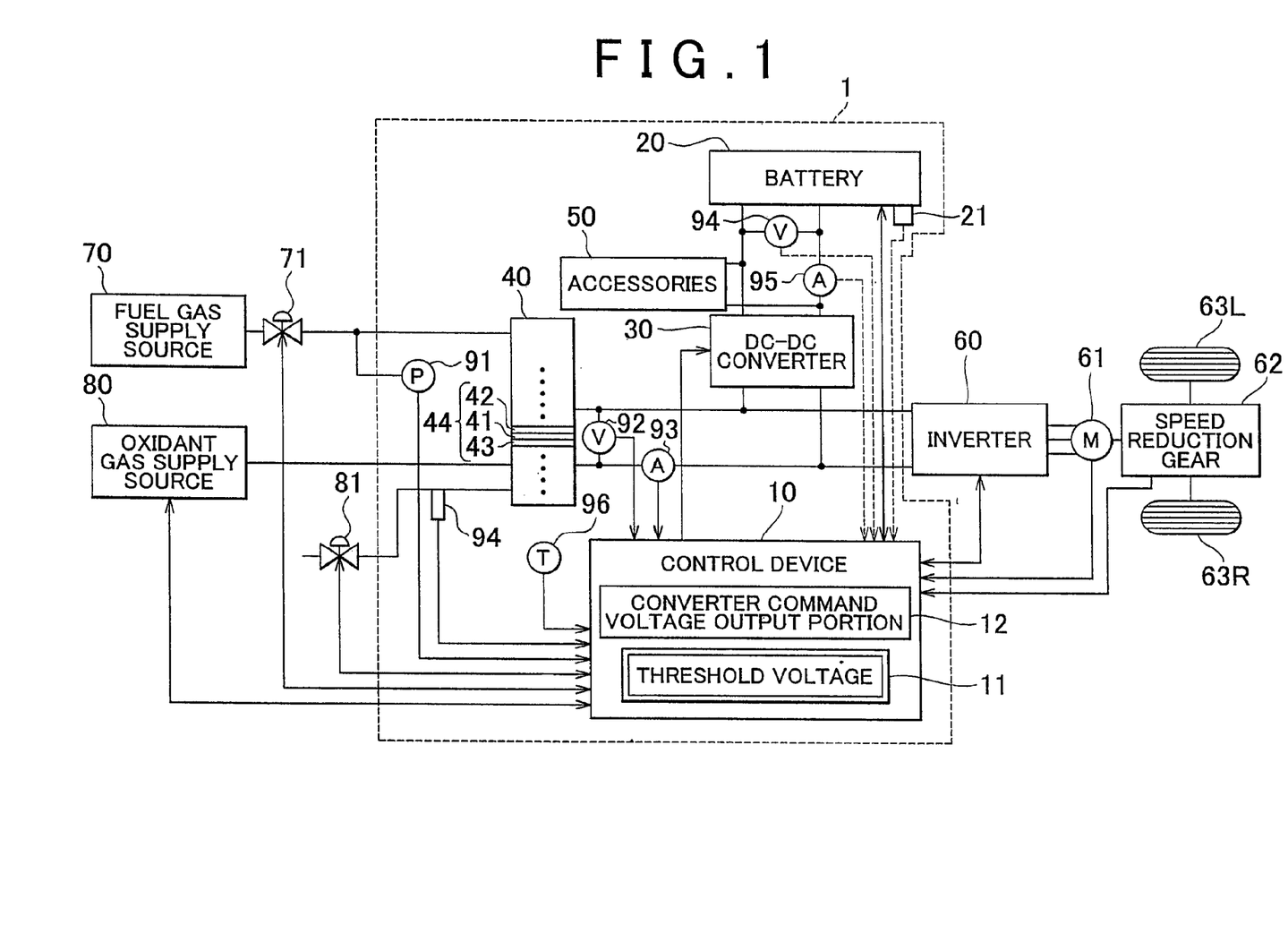
FIG. 1 is a system construction diagram showing a construction of portions of a fuel cell system as a first embodiment of the invention.

FIG. 1 is a system construction diagram showing a construction of portions of a fuel cell system 100 as a first embodiment of the invention. Although this embodiment is assumed herein to be a fuel cell system that is mounted in a vehicle such as a fuel cell hybrid vehicle (FCHV), an electric motor vehicle, a hybrid motor vehicle, etc, the embodiment is also applicable to various other mobile units (e.g., two-wheel vehicles, ships and boats, airplanes, robots, etc.). Besides fuel cell systems mounted in mobile units, the embodiment is also applicable to stationary fuel cell systems and portable fuel cell systems.

This vehicle runs by using as a drive force source a traction motor 61 that is linked to wheels 63L and 663R via a speed reduction gear 62. An electric power source of the traction motor 61 is an electric power source system 1. The direct current output from the electric power source system 1 is converted into three-phase alternating current by an inverter 60, and the three-phase alternating current is supplied to the traction motor 61. The traction motor 61 is able to function also as an electricity generator during the braking of the vehicle. The electric power source system 1 is constructed of a fuel cell 40, a battery 20, a DC/DC converter 30, etc.

The fuel cell 40 generates electric power from reactant gases (a fuel gas and an oxidant gas) supplied thereto, and may be of any one of various types, including the solid polymer type, the phosphoric acid type, the molten carbonate type, etc. The fuel cell 40 includes a polymer electrolyte membrane 41 that is made of, for example, a protonconducting ion exchange membrane that is formed from a fluorine-based resin or the like. A platinum catalyst (electrode catalyst) is applied to surfaces of the polymer electrolyte membrane.

Incidentally, the catalyst applied to the polymer electrolyte membrane 41 is not limited to the platinum catalyst, but may also be a platinum cobalt catalyst (hereinafter, simply referred to as "catalyst"), or the like. Each of unit cells that constitute the fuel cell 40 includes a membrane-electrode assembly 44 in which an anode electrode 42 and a cathode electrode 43 are formed by screen printing on two opposite sides of the polymer electrolyte membrane 41. The fuel cell 40 has a stack structure in which a plurality of unit cells are stacked in series.

The output voltage of the fuel cell 40 (hereinafter, termed the FC voltage) and the output current thereof (hereinafter, termed the FC current) are detected by a voltage sensor 92 and an electric current sensor 93, respectively. A fuel electrode (anode) of the fuel cell 40 is supplied with a fuel gas, such as a hydrogen gas or the like, from a fuel gas supply source 70, while an oxygen electrode (cathode) thereof is supplied with an oxidant gas, such as air or the like, from an oxidant gas supply source 80.

The fuel gas supply source 70 is constructed of, for example, a hydrogen tank, various valves, etc., and controls the amount of the fuel gas supplied to the fuel cell 40, by adjusting the degree of valve opening, the on/off time, etc. Besides, the fuel cell 40 is supplied with a coolant via a coolant passageway (not shown). This coolant passageway is provided with a temperature sensor 96 that detects the temperature of the fuel cell 40 (hereinafter, referred to as "FC temperature").

The oxidant gas supply source 80 is constructed of, for example, an air compressor, an electric motor that drives the air compressor, an inverter, etc. The oxidant gas supply source 80 adjusts the amount of the oxidant gas supplied to the fuel cell 40, by adjusting the rotation speed of the electric motor, and the like.

The battery 20 is a secondary cell that is chargeable and dischargeable, and is constructed of, for example, a nickel metal hydride battery or the like. Apparently, the battery 20 may also be replaced by any chargeable-dischargeable electricity storage (e.g., a capacitor) that is other than the secondary cell. The battery 20 is interposed in a discharge path of the fuel cell 40, and is connected in parallel with the fuel cell 40. The battery 20 and the fuel cell 40 are connected in parallel to the traction motor inverter 60. The DC/DC converter 30 is provided between the battery 20 and the inverter 60.

The output voltage of the battery 20 (hereinafter, termed the battery voltage) and the output current thereof (hereinafter, termed the battery current) are detected by a voltage sensor 94 and a current sensor 95, respectively.

The inverter 60 is, for example, a PWM (Pulse Width Modulation) inverter that is constructed of a plurality of switching elements. The inverter 60 converts the direct-current power output from the fuel cell 40 or the battery 20 into three-phase alternating-current power, and supplies the converted power to the traction motor 61, according to a control command given from a control device 10. The traction motor 61 is an electric motor for driving wheels 63L and 63R. The rotation speed of this motor is controlled by the inverter 60.

The DC/DC converter 30 is, for example, a full-bridge converter that is constructed of four power transistors and a dedicated drive circuit (none of which are shown). The DC/DC converter 30 has a function of boosting or dropping the DC voltage input from the battery 20 and outputting the boosted or dropped voltage to the fuel cell 40 side, and a function of boosting or dropping the DC voltage input from the fuel cell 40 or the like and outputting the boosted or dropped voltage to the battery 20 side. Besides, the functions of the DC/DC converter 30 realize the charging and discharging of the battery 20.

Accessories (and the like) 50, such as vehicle accessories, FC accessories, etc., are connected between the battery 20 and the DC/DC converter 30. The battery 20 serves as a power source of the accessories 50. Incidentally, the term vehicle accessory refers to various electric power appliances (illumination appliances, air-conditioning appliances, hydraulic pumps, etc.) that are used during operation of the vehicle and the like, and the term FC accessory refers to various electric power appliances (pumps for supplying the gas or the oxidant gas, and the like) that are used to operate the fuel cell 40.

The operations of the forgoing elements and the like are controlled by the control device (control portion) 10. The control device 10 is equipped with a microcomputer that has therein a CPU, a ROM and a RAM.

The control device 10 controls various portions of the system, including a pressure regulating valve 71 provided on a fuel gas passageway, a pressure regulating valve 81 provided on an oxidant gas passageway, the fuel gas supply source 70, the oxidant gas supply source 80, the battery 20, the DC/DC converter 30, the inverter 60, etc., on the basis of sensor signals input to the control device 10. Various sensor signals are input to the control device 10, for example, a fuel gas supply pressure detected by a pressure sensor 91, the FC voltage detected by the voltage sensor 92, the FC current detected by the current sensor 93, the battery voltage detected by the voltage sensor 94, the battery current detected by the current sensor 95, the FC temperature detected by the temperature sensor 96, an SOC value that represents the state of charge (SOC) of the battery 20 detected by the SOC sensor 21, etc.

In order to improve fuel economy, the fuel cell system 100 of this embodiment performs an intermittent operation in which during a low-load operation, such as an idling operation, a low-speed travel, a regenerative braking operation, etc., the electricity generation of the fuel cell 40 is temporarily stopped and the battery 20 is used to supply electric power to loads (the traction motor 61 and the like). This intermittent operation is performed by the control device 10 closing the pressure regulating valve 71 provided on the fuel gas passageway and the pressure regulating valve 81 provided on the oxidant gas passageway and therefore stopping the supply of the reactant gases to the fuel cell 40.

Furthermore, during the intermittent operation of the fuel cell system 100 of this embodiment (specifically, during the stop in the intermittent operation; hereinafter, the same meaning applies), the fuel cell 40 is forced to generate electricity for the purpose of increasing the endurance of the fuel cell 40, and the like. That is, during the intermittent operation, the control device 10 forces the fuel cell 40 to generate electricity by commanding a demanded fuel cell voltage (hereinafter, referred to as "demanded FC voltage") to the DC/DC converter 30. Incidentally, the power (electric power; hereinafter, the same meaning applies) that is generated by the forced electricity generation is stored into the battery 20.

Figure 2:
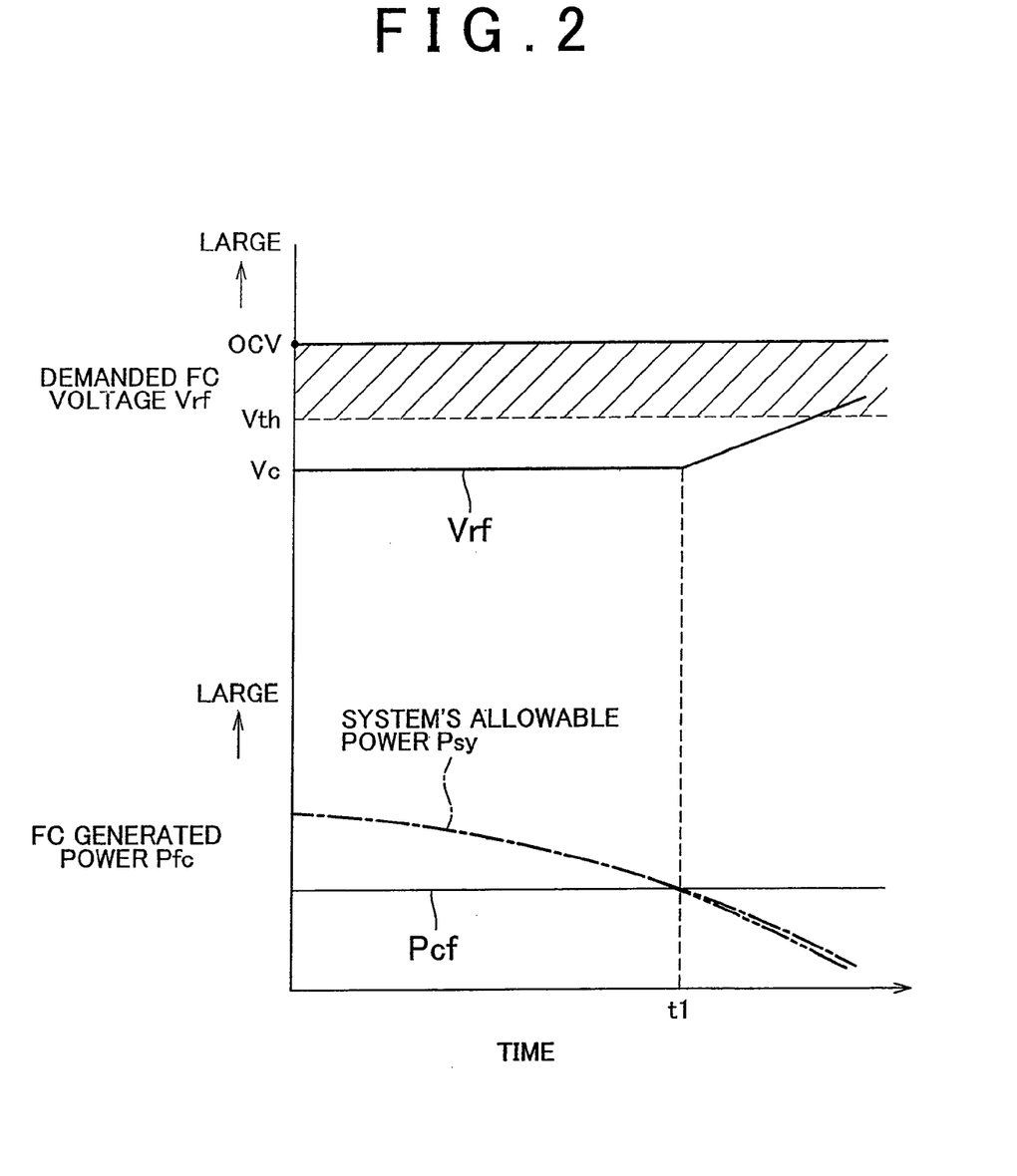
FIG. 2 is a timing chart showing time-dependent changes in demanded FC voltage Vrf, FC generated power Pfc and system's allowable power Psy during an intermittent operation.

FIG. 2 is a timing chart showing time-dependent changes in the demanded FC voltage Vrf, the FC generated power Pfc and the system's allowable power Psy during the intermittent operation. Incidentally, the system's allowable power Psy is the maximum electric power that can be utilized in the fuel cell system 100 through consumption or storage in the fuel cell system 100.

As shown in FIG. 2, the demanded FC voltage Vrf during the intermittent operation is a predetermined voltage Vc that is below a heightened potential avoidance threshold voltage (hereinafter, referred to as "threshold voltage") Vth. The threshold voltage Vth is lower than an open-circuit voltage of the fuel cell 40, and is found beforehand by experiments or the like, and is stored in an internal memory 11 of the control device 10 when the fuel cell 40 is manufactured or shipped, or the like. That is, when the demanded FC voltage Vrf becomes higher than or equal to the threshold voltage Vth, the fuel cell 40 enters a heightened-potential state. Besides, the threshold voltage Vth may be a fixed value, or may also be, for example, a value that is consecutively updatable according to ambient environments (the outside air temperature, the fuel cell temperature, humidity, operation mode, etc.). How much lower the demanded FC voltage is than the threshold voltage Vth can be arbitrarily set.

On another hand, the system's allowable power Psy during the intermittent operation gradually declines as time passes, as shown by a one-dot dashed line in FIG. 2. This is because the FC generated power Pfc is accumulated as time passes. From a time point t1 on in FIG. 2, the FC generated power Pfc exceeds the system's allowable power Psy. Specifically, from the time point t1 on, the FC generated power Pfc becomes unable to be absorbed by the battery 20.

Therefore, in this embodiment, from the time point t1 on, the FC generated power Pfc is caused to decrease following the system's allowable power Psy, as shown by a two-dot dashed line in FIG. 2. Incidentally, in the diagram of FIG. 2, the two-dot dashed line is slightly shifted from the one-dot dashed line that shows the system's allowable power Psy merely for the sake of convenience in illustration. Actually, the FC generated power Pfc is controlled so as to be equal to the system's allowable power Psy. Concretely, the control device 10 includes a converter command voltage output portion 12 (FIG. 1) that decreases the FC generated power Pfc.

Figure 3:
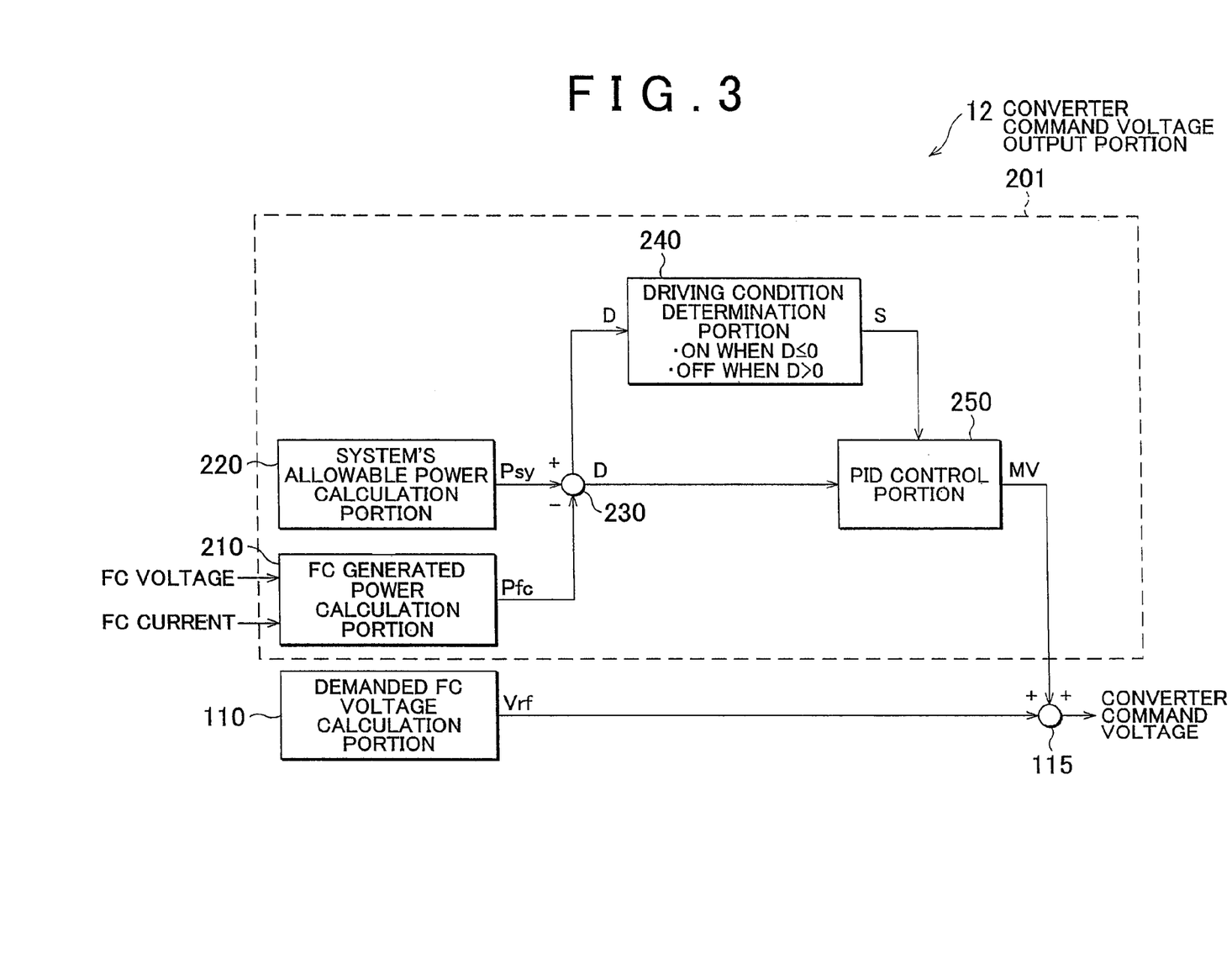
FIG. 3 is a block diagram showing a converter command voltage output portion.

FIG. 3 is a block diagram showing the converter command voltage output portion 12. As shown in FIG. 3, the converter command voltage output portion 12 includes a demanded FC voltage calculation portion 110 and a demanded FC voltage correction portion 201. Incidentally, although in this embodiment, the demanded FC voltage calculation portion 110 and the demanded FC voltage correction portion 201 are constructed of discrete electronic component parts, the demanded FC voltage calculation portion 110 and the demanded FC voltage correction portion 201 may also be constructed of a control process that is executed by the CPU provided in the control device 10.

The demanded FC voltage calculation portion 110 is a unit that calculates a demanded power of the fuel cell 40, and that calculates the output voltage of the fuel cell 40 commensurate with the demanded power as the demanded FC voltage Vrf by using a characteristic map (not shown) that represents an I-V characteristic and an I-P characteristic. The demanded power is, for example, an electric power for driving the traction motor 61 or the accessories 50. The characteristic map is found beforehand by experiments or the like, and is stored in the internal memory 11 of the control device 10 at the time of manufacture or shipment. Besides, during the intermittent operation, the demanded FC voltage calculation portion 110 calculates the predetermined voltage Vc that is below the heightened potential avoidance threshold voltage Vth, as a demanded FC voltage Vrf, regardless of the demanded power of the fuel cell 40 (i.e., even in the case where the demanded power is zero).

The demanded FC voltage correction portion 201 is a unit that calculates a voltage correction value for correcting the demanded FC voltage Vrf that is calculated by the demanded FC voltage calculation portion 110. The demanded FC voltage correction portion 201 includes an FC generated power calculation portion 210, a system's allowable power calculation portion 220, a subtraction portion 230, a driving condition determination portion 240, and a PID control portion 250. Incidentally, these portions 210 to 250 are constructions that are realized during the intermittent operation of the fuel cell 40, and assume other constructions when the intermittent operation is not performed. These other constructions will not be described in conjunction with the embodiment.

The FC generated power calculation portion 210 calculates the FC generated power Pfc on the basis of the FC voltage detected by the voltage sensor 92 and the FC current detected by the current sensor 93.

The system's allowable power calculation portion 220 is a unit that calculates the system's allowable power Psy of the fuel dell system 100. Generally, the system's allowable power Psy is a sum of the demanded power of the fuel cell system 100 and the charging power restriction value regarding the battery 20. The demanded power of the fuel cell system 100 includes all types of electric powers demanded by, for example, the traction motor 61, the accessories 50, etc., in the fuel cell system 100. The charging power restriction value regarding the battery 20 is a maximum electric power with which the battery 20 can be charged. Incidentally, how to find the demanded power of the fuel cell system 100 and the charging power restriction value regarding the battery 20 is well known, and is not described herein.

Although in the foregoing embodiment, the system's allowable power Psy is found by adding the demanded power of the fuel cell system 100 to the charging power restriction value regarding the battery 20, the system's allowable power Psy may instead be found by, for example, adding another electric power amount to the sum of the foregoing demanded power and the charging power restriction value. In short, the system's allowable power Psy may be found in any manner as long as the power (electric power amount) can be allowed in the entire fuel cell system 100.

The FC generated power Pfc found by the FC generated power calculation portion 210 and the system's allowable power Psy found by the system's allowable power calculation portion 220 are sent to the subtraction portion 230, which finds a deviation D by subtracting the FC generated power Pfc from the system's allowable power Psy. The deviation D is sent to the driving condition determination portion 240 and to the PID control portion 250.

The driving condition determination portion 240 determines whether or not to drive the PID control portion 250 on the basis of the deviation D, and sends to the PID control portion 250 a control command S commensurate with a result of the determination. Specifically, the driving condition determination portion 240 outputs a control command S to permit the driving, when the deviation D is less than or equal to zero. When the deviation D exceeds zero, the driving condition determination portion 240 outputs a control command S to prohibit the driving. Incidentally, it is also possible to adopt a construction in which when the deviation D becomes smaller than zero (falls below zero), a control command S to permit the driving is output.

When receiving from the driving condition determination portion 240 the control command S to permit the driving, the PID control portion 250 performs a PID control by using the deviation D as an input, and thereby calculates a voltage correction value MV that is an amount of operation for causing the FC generated power Pfc as a control object to be equal to the system's allowable power Psy, which is a target value. Incidentally, the PID control portion 250 sets the voltage correction value MV at zero, when receiving from the driving condition determination portion 240 the control command S to prohibit the driving.

Incidentally, the PID control portion 250 may also be replaced by various feedback control portions such as a P control portion that performs only a proportional control, a PI control portion that performs a PI control of proportional-plus-integral control, a PD control portion that performs a proportional-plus-derivative control, etc. Furthermore, the PID control portion 250 may be replaced by any control portion as long as the control portion performs a control of causing the deviation D to equal to the value 0.

The demanded FC voltage Vrf found by the demanded FC voltage calculation portion 110 and the voltage correction value MV found by the demanded FC voltage correction portion 201 are sent to the addition portion 115, and are added together. A result of the addition is sent as a converter command voltage to the DC/DC converter 30 (FIG. 1). As a result, the DC/DC converter 30 is able to control the output of the fuel cell 40 so that the output becomes equal to the sum of the demanded FC voltage Vrf and the voltage correction value MV. Since the voltage correction value MV is the amount of operation for causing the FC generated power Pfc to be equal to the system's allowable power Psy, the generated power Pfc of the fuel cell 40 equals the system's allowable power Psy. Incidentally, the equality between the power Pfc and the power Psy occurs when the PID control portion 250 is driven after the driving condition determination portion 240 has determined that the deviation D is less than or equal to the value 0.

Therefore, according to the converter command voltage output portion 12, the FC generated power Pfc decreases following the decrease of the system's allowable power Psy, from the time point t1 on in FIG. 2.

According to the fuel cell system 100 of the first embodiment constructed as described above, the output voltage of the fuel cell 40 is restrained from becoming greater than or equal to the heightened potential avoidance threshold voltage Vth during the intermittent operation of the fuel cell 40. Furthermore, during this restraint, an electric power control is performed such that the generated power Pfc of the fuel cell 40 does not exceed the system's allowable power Psy. Therefore, it is possible to avoid an event in which the battery 20 becomes overcharged due to the continued charging of the battery 20 when the fuel cell 40 is caused to generate electricity so as to avoid the heightening of potential during the intermittent operation of the fuel cell 40.

A second embodiment of the invention will be described. A fuel cell system in accordance with the second embodiment is different from the fuel cell system 100 of the first embodiment merely in a construction of a demanded FC voltage correction portion that is provided in a converter command voltage output portion, while the other constructions remain the same. Incidentally, the same portions as those in the first embodiment are denoted by the same reference characters as in the first embodiment.

Figure 4:
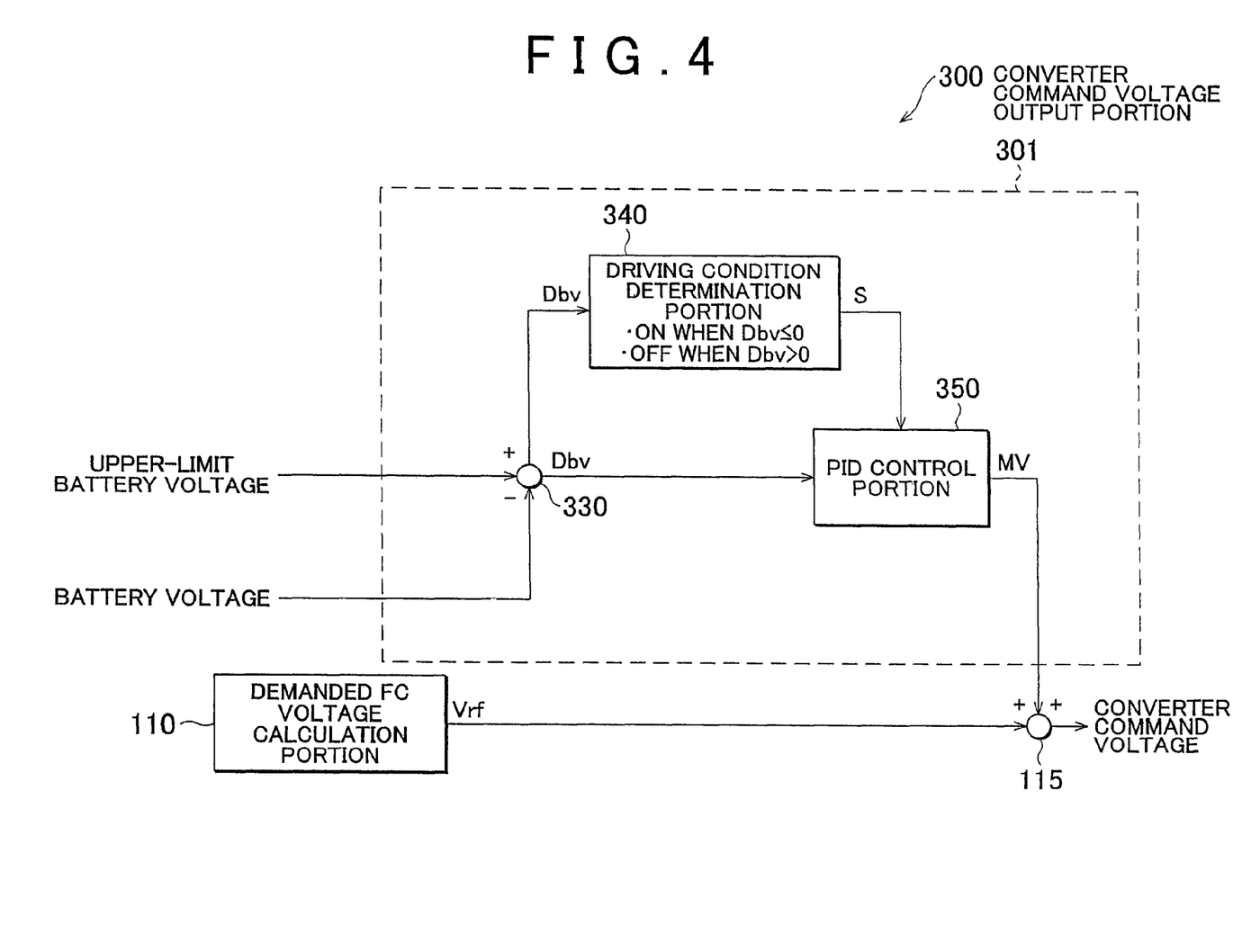
FIG. 4 is an illustrative diagram showing a converter command voltage output portion in a second embodiment of the invention.

FIG. 4 is an illustrative diagram showing a converter command voltage output portion 300 in the second embodiment. While the demanded FC voltage correction portion 201 in the first embodiment finds a deviation D by subtracting the FC generated power Pfc from the system's allowable power Psy, a demanded FC voltage correction portion 301 provided in a converter command voltage output portion 300 in the second embodiment finds a deviation Dbv obtained by subtracting the battery voltage from a battery upper-limit voltage through the use of a subtraction portion 330 as shown in FIG. 4. The battery upper-limit voltage is an upper-limit voltage value of the battery 20, and is found beforehand by experiments or the like. Incidentally, the battery upper-limit voltage may be a predetermined value that has been subjected to a temperature correction based on the battery temperature detected by a temperature sensor (not shown). The battery voltage is the output voltage of the battery 20 detected by the voltage sensor 94.

Using the deviation Dbv, a PID control portion 350 performs the PID control in substantially the same manner as in the first embodiment. Incidentally, a driving condition determination portion 340 outputs to the PID control portion 350 a control command S to permit the driving, when the deviation Dbv is less than or equal to the value 0. When the deviation Dbv exceeds the value 0, the driving condition determination portion 340 outputs to the PID control portion 350 a control command S to prohibit the driving. It is also possible to adopt a construction in which when the deviation Dbv becomes smaller than the value 0 (falls below the value 0), the control command S to permit the driving is output.

According to the fuel cell system of the second embodiment constructed as described above, during the intermittent operation of the fuel cell 40, the output voltage of the fuel cell 40 is restrained from becoming greater than or equal to the heightened potential avoidance threshold voltage, as in the first embodiment. Furthermore, during the restraint, an electric power control is performed such that the battery voltage does not exceed the battery upper-limit voltage. Therefore, it is possible to avoid an event in which the battery 20 becomes overcharged due to the continued charging of the battery 20 when the fuel cell 40 is caused to generate electricity so as to avoid the heightening of potential during the intermittent operation of the fuel cell 40.

A third embodiment of the invention will be described. A fuel cell system of the third embodiment is different from the fuel cell system 100 of the first embodiment merely in a construction of a demanded FC voltage correction portion provided in a converter command voltage output portion, while the other constructions remain the same. Incidentally, the same portions as those in the first embodiment are denoted by the same reference characters as in the first embodiment.

Figure 5:
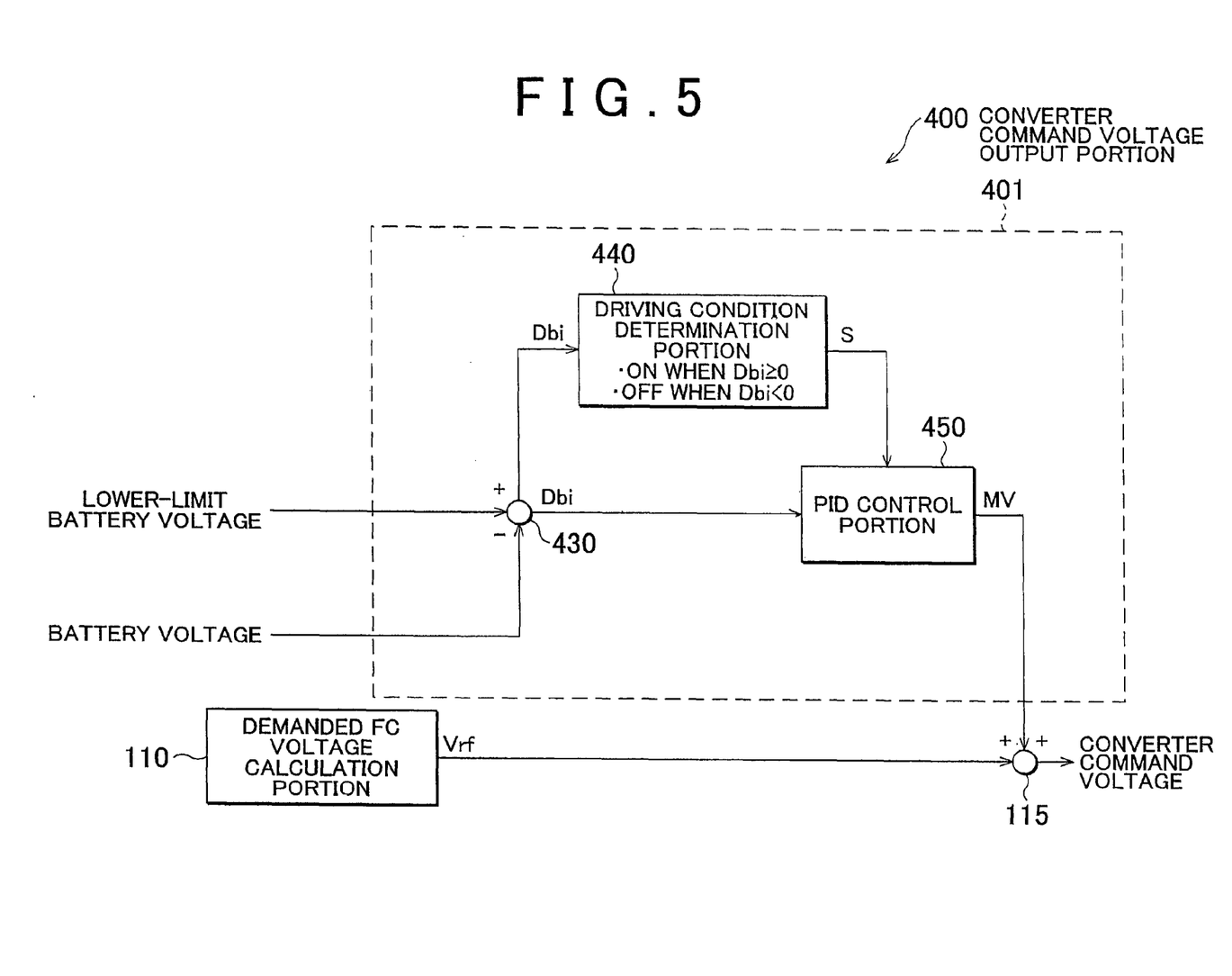
FIG. 5 is an illustrative diagram showing a converter command voltage output portion in a third embodiment of the invention.

FIG. 5 is an illustrative diagram showing a converter command voltage output portion 400 in the third embodiment. While the demanded FC voltage correction portion 201 in the first embodiment finds a deviation D by subtracting the FC generated power Pfc from the system's allowable power Psy, a demanded FC voltage correction portion 401 provided in a converter command voltage output portion 400 in the third embodiment finds a deviation Dbi obtained by subtracting the battery current from a battery lower-limit current, through the use of a subtraction portion 430, as shown in FIG. 4. The battery lower-limit current is a lower-limit current value of the battery 20, and is a maximum charging current amount of the battery 20. The battery lower-limit current is a value that is found beforehand by experiments or the like. The battery current is the output current of the battery 20 detected by the current sensor 95.

Using the deviation Dbi, a PID control portion 450 performs the PID control, in substantially the same manner as in the first embodiment. Incidentally, the driving condition determination portion 440 outputs to the PID control portion 450 a control command S to permit the driving, when the deviation Dbi is greater than or equal to the value 0. When the deviation Dbi is less than the value 0, the driving condition determination portion 440 outputs to the PID control portion 450 a control command S to prohibit the driving. It is also possible to adopt a construction in which when the deviation Dbi becomes larger than the value 0 (exceeds the value 0), the control command S to permit the driving is output.

According to the fuel cell system of the third embodiment constructed as described above, during the intermittent operation of the fuel cell 40, the output voltage of the fuel cell 40 is restrained from becoming greater than or equal to the heightened potential avoidance threshold voltage, as in the first embodiment. Furthermore, during the restraint, an electric power control is performed such that the battery current does not fall below the battery lower-limit current. Therefore, it is possible to avoid an event in which the battery 20 becomes overcharged due to the continued charging of the battery 20 when the fuel cell 40 is caused to generate electricity so as to avoid the heightening of potential during the intermittent operation of the fuel cell 40.

A fourth embodiment of the invention will be described. A fuel cell system of the fourth embodiment is different from the fuel cell system 100 of the first embodiment merely in a construction of a demanded FC voltage correction portion provided in a converter command voltage output portion, while the other constructions remain the same. Incidentally, the same portions as those in the first embodiment are denoted by the same reference characters as in the first embodiment.

Figure 6:
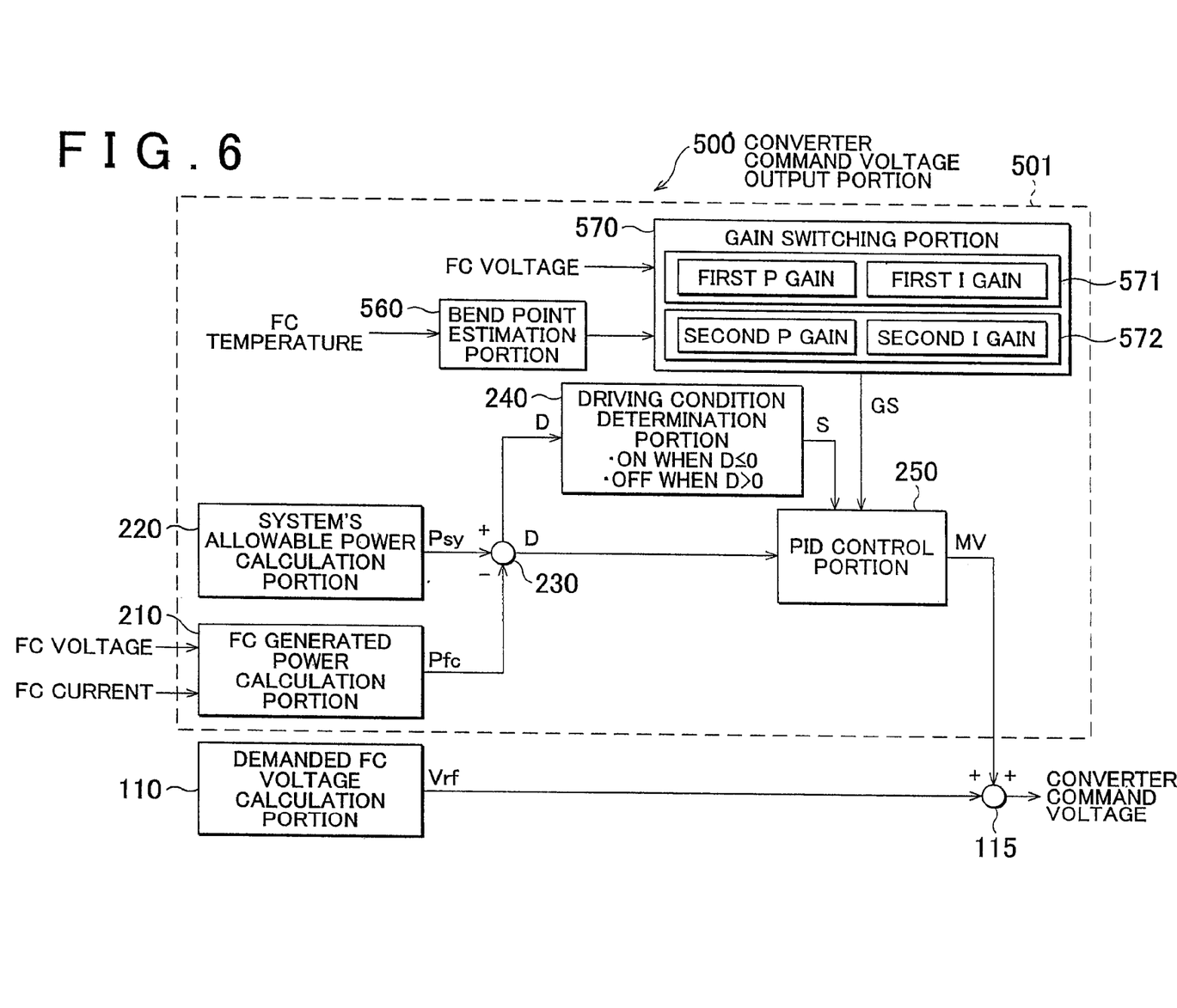
FIG. 6 is an illustrative diagram showing a converter command voltage output portion in a fourth embodiment of the invention.

FIG. 6 is an illustrative diagram showing a converter command voltage output portion 500 in the fourth embodiment. A demanded FC voltage correction portion 501 provided in the converter command voltage output portion 500 includes the same portions 210 to 250 as those provided in the demanded FC voltage correction portion 201 in the first embodiment, and further includes a bend point estimation portion 560 and a gain switching portion 570. Although the PID control portion 250 is denoted by the same reference numeral as in the first embodiment, the PID control portion 250 in the fourth embodiment is different in the following respects, in a precise sense. While the gains (the P gain and the I gain) are fixed values in the PID control portion 250 in the first embodiment, the gains (the P and I gains) are switched according to a gain designation signal GS input to a gain switching portion 570 in the fourth embodiment.

A bend point estimation portion 560 takes in the FC temperature detected by the temperature sensor 96, and estimates a bend point of a curve that shows the current-voltage characteristic of the fuel cell 40 (hereinafter, referred to as "I-V curve") on the basis of the FC temperature.

Figure 7:
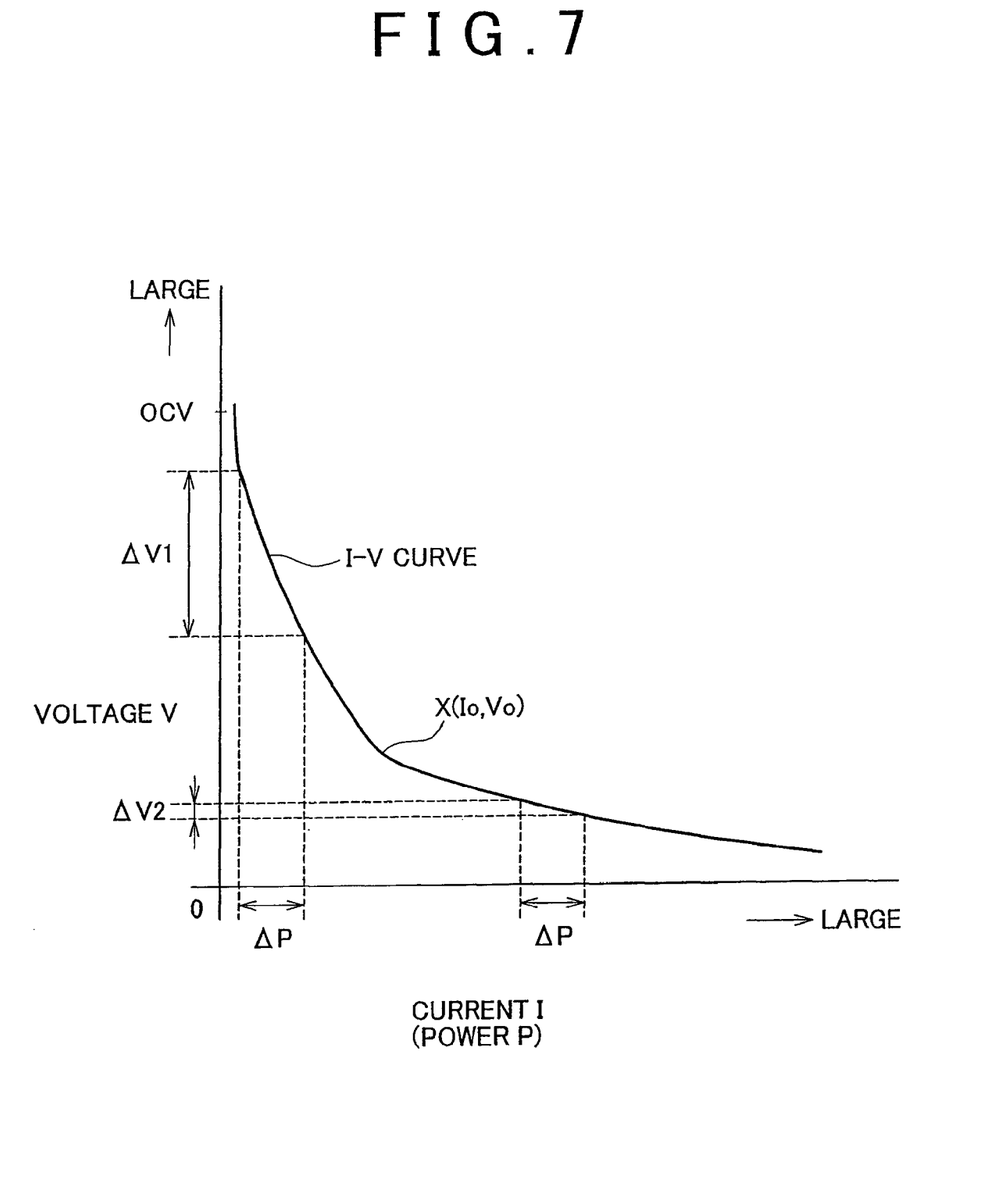
FIG. 7 is a graph showing an example of an I-V curve.

FIG. 7 is a graph showing an example of the I-V curve. In the graph, the horizontal axis represents the FC current I, and the vertical axis represents the FC voltage V. On the I-V curve, the voltage V decreases as the current I increases. The I-V curve has a bend point X at which the curvature reaches a maximum value. The bend point estimation portion 560 estimates a position (I0, V0) of the bend point X.

Since the I-V curve changes depending on the FC temperature, the bend point X (I0, V0) can be estimated for every temperature value by finding I-V curves commensurate with various temperatures beforehand through experiments or the like. The bend point estimation portion 560 pre-stores the bend points X (I0, V0) for various temperatures, so as to be able to find a bend point X (I0, V0) based on the FC temperature detected by the temperature sensor 96. Incidentally, although in this embodiment, the bend point X is represented by the current I and the voltage V, the bend point X may instead be represented by only the voltage V, that is, may be X(V0).

The gain switching portion 570 takes in the FC voltage detected by the voltage sensor 92 and the bend point X found by the bend point estimation portion 560, and selectively switches the gain (P gain and I gain) for use in the PID control portion 250.

The gain switching portion 570 includes a first memory 571 that stores a first P gain value and a first I gain value, and a second memory 572 that stores a second P gain value and a second I gain value. A combination of the first P gain value and the first I gain value makes a change in such a direction as to raise the gain in the PID control, whereas a combination of the second P gain value and the second I gain value makes a change in such a direction as to lower the gain in the PID control.

The gain switching portion 570 determines whether or not the FC voltage is greater than or equal to a voltage value V0 of the bend point X. If it is determined that the FC voltage is greater than or equal to the voltage value V0, the gain switching portion 570 extracts the first P gain value and the first I gain value from the first memory 571, and sends the two values as a gain designation signal GS to the PID control portion 250. On the other hand, if it is determined that the FC voltage is below the voltage value V0, the gain switching portion 570 extracts the second P gain value and the second I gain value from the second memory 572, and sends the two values as a gain designation signal GS to the PID control portion 250. As a result, when the FC voltage is greater than or equal to the voltage value V0 of the bend point X, the gain in the PID control is changed in an increasing direction. When the FC voltage is below the voltage value V0 of the bend point X, the gain in the PID control is changed in a decreasing direction. The construction in which the gain in the PID control is changed is adopted for the following reason.

If the current I on the horizontal axis in FIG. 7 is replaced with the power P, an I-P curve thus obtained shows the same changes as the I-V curve shown in FIG. 7. With regard to the voltage change relative to a predetermined amount of power change, the voltage change $\Delta V1$ that occurs when the FC voltage is greater than or equal to the voltage value V0 of a bend point X is greater than the voltage change $\Delta V2$ that occurs when the FC voltage is less than the voltage value V0 of the bend point X, as indicated in FIG. 7. In the PID control executed by the PID control portion 250, the electric power deviation between the system's allowable power Psy and the FC generated power Pfc is brought to the value 0, as described above in conjunction with the first embodiment. Therefore, the voltage correction value for the electric power deviation is distinctly different between two sections (or regions) of the curve divided by the bend point X (between when the voltage is greater than the voltage value V0 of the bend point X and when the voltage is less than the voltage value V0), as can be understood from the foregoing voltage changes $\Delta V1$ and $\Delta V2$. Because of this, the controllability of the PID control deteriorates. Therefore, the controllability of the PID control is heightened by increasing the gain in the PID control performed in the region to the left of the bend point X (in which the voltage is greater than the voltage value V0 of the bend point X) and decreasing the gain in the PID control performed in the region to the right of the bend point X (in which the voltage is smaller than the voltage value V0 of the bend point X).

Therefore, the fuel cell system of the fourth embodiment is able to achieve the same effects as the first embodiment, and is also able to heighten the controllability of the electric power control.

Besides, the fuel cell system of the fourth embodiment can be modified as described in the following paragraphs (1) to (4).

(1) Although in the fourth embodiment, it is determined which one of the two sections of the I-V curve divided by the bend point X contains the point that corresponds to a given FC voltage by comparing the FC voltage with the voltage value V0 of the bend point X, it is also permissible to adopt a construction in which it is determined which one of the two sections of the I-V curve divided by the bend point X contains a point on the same curve that corresponds to an FC current by comparing the FC current with the current value I0 of the bend point X (2) Although in the fourth embodiment, the bend point X is found on the basis of the FC temperature, it is also permissible to adopt a construction in which the impedance value of the fuel cell is found on the basis of the FC voltage detected by the voltage sensor 92 and the FC current detected by the current sensor 93, and in which the bend point X is found on the basis of the impedance value. From the impedance value of the fuel cell, the amount of voltage fall caused by the resistance overvoltage of the fuel cell (which is proportional to the amount of water contained within the fuel cell) can be known, so that the bend point X of the curve can be estimated.

(3) Although the fourth embodiment has a construction in which the bend point X is estimated by the bend point estimation portion 560 and in which the bend point thus obtained is compared with the present FC voltage to determine which side of the bend point contains the point that corresponds to the present FC voltage, it is also permissible to replace this construction with a construction in which the a differential resistance dV/dI that represents the change in voltage relative to the change in current is found on the basis of the FC voltage detected by the voltage sensor 92 and the FC current detected by the current sensor 93 and in which it is determined which side of the bend point X contains the point of the detected FC voltage and the detected FC current. Specifically, it is found beforehand how large the differential resistance is when the bend point X is reached (i.e., the magnitude of the differential resistance at the bend point X is found beforehand), and it is determined which side of the bend point X contains the point of an FC voltage and an FC current that are presently detected, by comparing the differential resistance dV/dI at that point with the foregoing bend-point differential resistance.

(4) Although the fourth embodiment has a construction in which the voltage is controlled by the PID control, and in which when the FC voltage is greater than or equal to the voltage value V0 of the bend point X, a gain change is made in such a direction as to raise the gain in the PID control, and when the FC voltage is less than the voltage value V0, a gain change is made in such a direction as to decrease the gain in the PID control, it is also permissible to replace this construction with a construction in which the current is controlled by the PID control, and in which when the FC voltage is greater than or equal to the voltage value V0 of the bend point X, a gain change is made in such a direction as to decrease the gain in the PID control, and when the FC voltage is less than the voltage value V0 of the bend point X, a gain change is made in such a direction as to raise the gain in the PID control.

A fifth embodiment of the invention will be described. A fuel cell system in accordance with the fifth embodiment is different from the fuel cell system of the fourth embodiment merely in a construction of a demanded FC voltage correction portion that is provided in a converter command voltage output portion, while the other constructions remain the same. Incidentally, the same portions as those in the fourth embodiment are denoted by the same reference characters as in the first embodiment.

Figure 8:
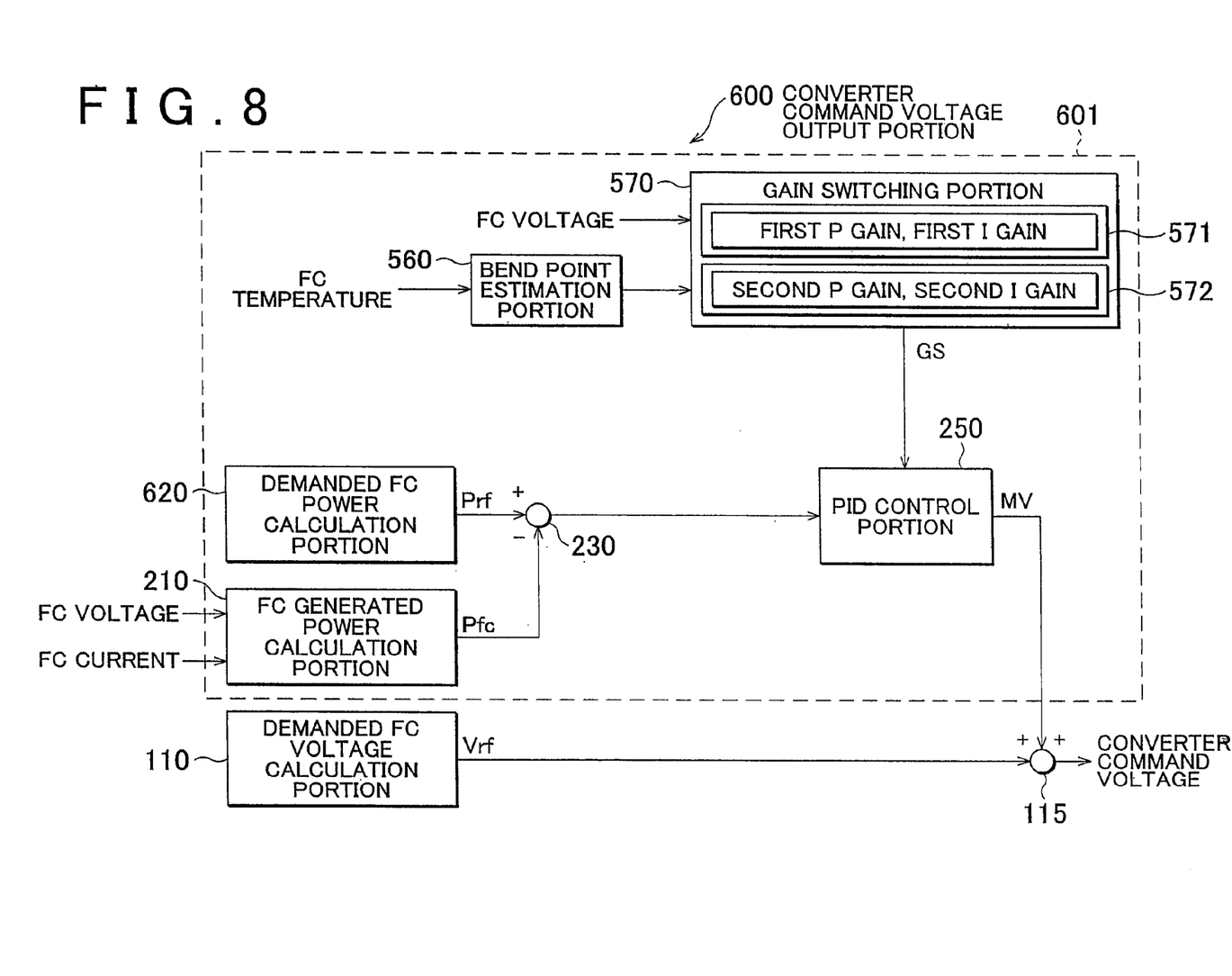
FIG. 8 is an illustrative diagram showing a converter command voltage output portion in a fifth embodiment of the invention.

FIG. 8 is an illustrative diagram showing a converter command voltage output portion 600 in the fifth embodiment. A demanded FC voltage correction portion 601 provided in the converter command voltage output portion 600 is the same as the demanded FC voltage correction portion 501 provided in the fourth embodiment in that the demanded FC voltage correction portion 601 includes an FC generated power calculation portion 210, a subtraction portion 230 a PID control portion 250, a bend point estimation portion 560, and a gain switching portion 570, and is different therefrom in the following respects i) to iii).

That is, the demanded FC voltage correction portion 601 in the converter command voltage output portion 600 and the demanded FC voltage correction portion 501 in the fourth embodiment are different in that: i) an internal construction of the demanded FC voltage correction portion 501 in the fourth embodiment is realized during the intermittent operation, whereas an internal construction of the demanded FC voltage correction portion 601 in the fifth embodiment is realized during the ordinary operation; ii) the system's allowable power calculation portion 220 is provided in the fourth embodiment, whereas a demanded FC power calculation portion 620 is provided in the fifth embodiment; and iii) the driving condition determination portion 240 is provided in the fourth embodiment, whereas a driving condition determination portion is not provided in the fifth embodiment.

The demanded FC power calculation portion 620 is a unit that calculates a demanded output power Prf of the fuel cell 40. Specifically, the demanded FC power calculation portion 620 calculates the demanded output power of the fuel cell 40 on the basis of sensor signals sent from a rotation speed-detecting sensor (not shown) that is provided in the traction motor 61, an accelerator pedal sensor (not shown) that detects the amount of operation of the accelerator pedal, etc.

The converter command voltage output portion 600 of the fifth embodiment constructed as described above performs the PID control of the voltage correction value MV on the basis of a deviation obtained by subtracting the generated power Pfc of the fuel cell from the demanded output power Prf of the fuel cell. Therefore, during the ordinary operation of the fuel cell, the generated power Pfc of the fuel cell can be made equal to the demanded output power Prf. Furthermore, in the fuel cell system of the fifth embodiment, the gain in the PID control is switched at the bend point X on the I-V curve (i.e., different gains are set for the two sections of the I-V curve divided by the bend point X), so that the controllability in the PID control can be heightened, as in the fourth embodiment.

The invention is not limited to the first to fifth embodiments and modifications thereof, but can be carried out in various forms without departing from the gist of the invention; for example, the following modifications are possible.

Although in the first to fifth embodiments and their modifications, the demanded FC voltage, which is a command voltage value, is output to the converter, this construction may be replaced by a construction in which a command current value is output to the converter. As for the correction value output from the PID control portion in this case, the voltage correction value MV is replaced by an electric current correction value. This modified construction also achieves substantially the same effects as the foregoing embodiments.

Besides, the invention may also be applied to kinds of fuel cells different from those of the embodiments and their modifications. For example, the invention can be applied to a direct methanol type fuel cell. The invention may also be applied to fuel cells that have electrolyte layers other than a solid polymer, and the application of the invention thereto will achieve substantially the same effects.

Incidentally, among the component elements in the foregoing embodiments and modifications, the elements other than the elements described in the claims for patent are additional elements, and can be omitted as appropriate. Besides, the invention is not limited at all to the foregoing embodiments or modifications thereof, and can be carried out in various forms without departing from the gist of the invention.

The invention claimed is:

1. A fuel cell system that includes a fuel cell and a secondary cell, and that supplies electric power to a load, comprising:
    a converter that controls output voltage of the fuel cell; and
    a high-potential avoidance control portion that restrains output voltage of the fuel cell from becoming greater than or equal to a predetermined heightened potential avoidance threshold voltage that is lower than an open-circuit voltage of the fuel cell by controlling a command value provided for the converter during an intermittent operation of the fuel cell, wherein
    the high-potential avoidance control portion includes a converter command value correction portion that corrects the command value for the converter so that a deviation obtained by subtracting a generated power of the fuel cell from a system's allowable power that is allowable in the fuel cell system becomes equal to a value 0 when the deviation is below the value 0,
    wherein a demanded fuel cell voltage setting portion that sets a predetermined voltage that is below the predetermined heightened potential avoidance threshold voltage, as a demanded fuel cell voltage,
    wherein a voltage correction value calculation portion that, when the deviation is less than or equal to zero, calculates a voltage correction value MV that is an amount of operation for causing the fuel cell generated power to be equal to the system's allowable power, and when the deviation exceeds zero, set a voltage correction value MV at zero, and
    wherein a converter command voltage output portion that outputs a value obtained by adding a demanded fuel cell voltage Vrf set by the demanded fuel cell voltage setting portion to the voltage correction value MV as a converter command voltage to the converter.

2. The fuel cell system according to claim 1, wherein the converter command value correction portion obtains the system's allowable power by summing a demanded power of the fuel cell system and a charging power restriction value regarding the secondary cell.

3. The fuel cell system according to claim 1, further comprising
    an output detection portion that detects output current of the fuel cell or the output voltage of the fuel cell, wherein
    the converter command value correction portion includes:
    a feedback control portion that performs a feedback control based on the deviation;
    a determination portion that determines which one of two sections of a current-voltage curve of the fuel cell divided by a bend point, at which a curvature of the current-voltage curve reaches a maximum value, contains a point of the output current or the output voltage detected by the output detection portion; and
    a gain switching portion that switches gain of the feedback control based on a result of determination of the determination portion,
    wherein a plurality of the current-voltage curves is stored, each of the current-voltage curves is set in accordance with a temperature of the fuel cell, and each of the current-voltage curves has the bend point which varies in accordance with the temperature of the fuel cell, and
    wherein a first gain value and a second gain value of the feedback control is stored, each of the first gain value and the second gain value is set in accordance with the output current of the fuel cell or the output voltage of the fuel cell, and the gain switching portion selects the first gain.

4. A fuel cell system that includes a fuel cell and a secondary cell, and that supplies electric power to a load, comprising:
    a converter that controls output voltage of the fuel cell; and
    a high-potential avoidance control portion that, during an intermittent operation of the fuel cell, restrains output voltage of the fuel cell from becoming greater than or equal to a predetermined heightened potential avoidance threshold voltage that is lower than an open-circuit voltage of the fuel cell, by controlling a command value provided for the converter, wherein
    the high-potential avoidance control portion includes a converter command value correction portion that corrects the command value for the converter so that a deviation obtained by subtracting an output voltage of the secondary cell from an upper-limit voltage of the secondary cell becomes equal to a value 0 when the deviation is lower than the value 0,
    wherein a demanded fuel cell voltage setting portion that sets a predetermined voltage that is below the predetermined heightened potential avoidance threshold voltage, as a demanded fuel cell voltage,
    wherein a voltage correction value calculation portion that, when the deviation is less than or equal to zero, calculates a voltage correction value MV that is an amount of operation for causing the fuel cell generated power to be equal to the system's allowable power, and when the deviation exceeds zero, set a voltage correction value MV at zero, and
    wherein a converter command voltage output portion that outputs a value obtained by adding a demanded fuel cell voltage Vrf set by the demanded fuel cell voltage setting portion to the voltage correction value MV, as a converter command voltage to the converter.

5. A fuel cell system that includes a fuel cell and a secondary cell, and that supplies electric power to a load, comprising:

a converter that controls output voltage of the fuel cell; and a high-potential avoidance control portion that restrains output voltage of the fuel cell from becoming greater than or equal to a predetermined heightened potential avoidance threshold voltage that is lower than an open-circuit voltage of the fuel cell by controlling a command value provided for the converter during an intermittent operation of the fuel cell, wherein the high-potential avoidance control portion includes a converter command value correction portion that corrects the command value for the converter so that a deviation obtained by subtracting an output current of the secondary cell from a lower-limit current of the secondary cell becomes equal to a value 0 when the deviation is greater than the value 0, wherein a demanded fuel cell voltage setting portion that sets a predetermined voltage that is below the predetermined heightened potential avoidance threshold voltage, as a demanded fuel cell voltage, wherein a voltage correction value calculation portion that, when the deviation is less than or equal to zero, calculates a voltage correction value MV that is an amount of operation for causing the fuel cell generated power to be equal to the system's allowable power, and when the deviation exceeds zero, set a voltage correction value MV at zero, and wherein a converter command voltage output portion that outputs a value obtained by adding a demanded fuel cell voltage Vrf set by the demanded fuel cell voltage calculation portion to the voltage correction value MV as a converter command voltage to the converter.

6. A fuel cell system that includes a fuel cell and a secondary cell, and that supplies electric power to a load, comprising:

a converter that controls output voltage of the fuel cell;

a converter command value correction portion that performs a feedback control of a correction value for a command value provided for the converter based on a deviation obtained by subtracting a generated electric power of the fuel cell from a demanded output electric power of the fuel cell, and that adds the correction value to the command value provided for the converter; and an output detection portion that detects output current of the fuel cell or the output voltage of the fuel cell, wherein the converter command value correction portion includes:
a determination portion that determines which one of two sections of a current-voltage curve of the fuel cell divided by a bend point contains a point of an output current or an output voltage of the fuel cell detected by the output detection portion; and a gain switching portion that switches gain of the feedback control based on a result of determination of the determination portion, wherein a plurality of the current-voltage curves is stored, each of the current-voltage curves is set in accordance with a temperature of the fuel cell, and each of the current-voltage curves has the bend point which varies in accordance with the temperature of the fuel cell, and wherein a first gain value and a second gain value of the feedback control is stored, each of the first gain value and the second gain value is set in accordance with the output current of the fuel cell or the output voltage of the fuel cell, and the gain switching portion selects the first gain.

7. A control method for a fuel cell system that includes: a fuel cell; a secondary cell; and a converter which controls output voltage of the fuel cell, and that supplies electric power to a load, the control method comprising:

restraining the output voltage of the fuel cell from becoming a greater than or equal to a predetermined heightened potential avoidance threshold voltage that is lower than an open-circuit voltage of the fuel cell by controlling a command value provided for the converter during an intermittent operation of the fuel cell;

obtaining a deviation by subtracting a generated power of the fuel cell from a system's allowable power that is allowable in the fuel cell system;

correcting the command value for the converter so that the deviation becomes equal to a value 0 when the deviation is less than the value 0;

setting a predetermined voltage that is below the predetermined heightened potential avoidance threshold voltage, as a demanded fuel cell voltage;

when the deviation is less than or equal to zero, calculating a voltage correction value MV that is an amount of operation for causing the fuel cell generated power to be equal to the system's allowable power, and when the deviation exceeds zero, setting a voltage correction value MV at zero, and outputting a value obtained by adding a demanded fuel cell voltage Vrf to the voltage correction value MV as a converter command voltage to the converter.

* * * * *